(12) United States Patent
Chen et al.

(10) Patent No.: US 11,098,569 B2
(45) Date of Patent: Aug. 24, 2021

(54) SYSTEM AND METHOD OF PERFORMING OIL DISPLACEMENT BY WATER-GAS DISPERSION SYSTEM

(71) Applicant: PetroChina Company Limited, Beijing (CN)

(72) Inventors: Xinglong Chen, Beijing (CN); Jiazhong Wu, Beijing (CN); Hongwei Yu, Beijing (CN); Shi Li, Beijing (CN); Haishui Han, Beijing (CN)

(73) Assignee: PetroChina Company Limited, Beijing (CN)

( * ) Notice: Subject to any disclaimer, the term of this patent is extended or adjusted under 35 U.S.C. 154(b) by 380 days.

(21) Appl. No.: 16/359,115

(22) Filed: Mar. 20, 2019

(65) Prior Publication Data

US 2020/0072031 A1    Mar. 5, 2020

(30) Foreign Application Priority Data

Sep. 5, 2018 (CN) .......................... 201811031150.3

(51) Int. Cl.
*E21B 43/34* (2006.01)
*B01D 17/02* (2006.01)
(Continued)

(52) U.S. Cl.
CPC .......... *E21B 43/34* (2013.01); *B01D 17/0205* (2013.01); *B01F 3/04* (2013.01);
(Continued)

(58) Field of Classification Search
CPC ......... B01F 3/04; B01F 3/04106; E21B 43/16
See application file for complete search history.

(56) References Cited

U.S. PATENT DOCUMENTS 6,398,195 B1 * 6/2002 Sherman ............ B01F 3/04262
261/122.1

FOREIGN PATENT DOCUMENTS

CN        2297256 Y     11/1998
CN     103670391 A      3/2014
(Continued)

OTHER PUBLICATIONS

Chinese Search Report dated Aug. 8, 2018 (G1808252).
(Continued)

*Primary Examiner* — Robert A Hopkins
(74) *Attorney, Agent, or Firm* — Michael Best and Friedrich LLP (57) ABSTRACT

A system and method of performing oil displacement by a water-gas dispersion system includes a micro-bubble generation apparatus, a gas source, an ultrasonic oscillation controller, a protective barrel and a support. A first opening is provided in a top end of the protective barrel, into which an internal apparatus enters and is extracted, the first opening is sealed by an end cover. A second opening communicating with a water flooding pipeline is provided in a side wall of the protective barrel, into which fluid flows and from which the fluid exits. The micro-bubble generation apparatus is fixed within the protective barrel by the support. The gas source is connected with the micro-bubble generation apparatus through a gas pipeline, for transporting gas to the micro-bubble generation apparatus. The ultrasonic oscillation controller is connected to the micro-bubble generation apparatus through a signal line, for controlling the micro-bubble generation apparatus to generate micro-bubbles.

19 Claims, 8 Drawing Sheets

(51) Int. Cl.
*E21B 43/16* (2006.01)
*B01F 3/04* (2006.01)
*B01D 17/12* (2006.01)

(52) U.S. Cl.
CPC ...... *B01F 3/04106* (2013.01); *B01F 3/04113* (2013.01); *E21B 43/166* (2013.01); *B01D 17/12* (2013.01)

(56) References Cited

FOREIGN PATENT DOCUMENTS

| | | |
|---|---|---|
| CN | 104912525 A | 9/2015 |
| CN | 105148760 A | 12/2015 |
| CN | 105148819 A | 12/2015 |
| CN | 105586025 A | 5/2016 |
| RU | 2391495 C1 | 6/2010 |
| RU | 2610745 C1 | 2/2017 |
| RU | 107815301 A | 3/2018 |

OTHER PUBLICATIONS

Chinese Patent Office Action and Search Report for Application No. 201811031150.3 dated Apr. 14, 2020 (20 pages, English translation included).

\* cited by examiner

SYSTEM AND METHOD OF PERFORMING OIL DISPLACEMENT BY WATER-GAS DISPERSION SYSTEM

CROSS REFERENCES TO RELATED APPLICATIONS

The present invention contains subject matter related to Chinese Patent Application No.: 201811031150.3, filed Sep. 5, 2018, of which the entire contents are hereby incorporated by reference in the present application.

TECHNICAL FIELD

The invention relates to the field of oil and gas exploration and development technology, and in particular to a system and method of performing oil displacement by a water-gas dispersion system.

BACKGROUND ART

In the field of oil development, an entirety formed by dispersing micron-sized bubbles in aqueous phase is called a water-gas dispersion system. During oil displacement, micro bubbles can enter pores into which it is difficult for injected water to get, thereby improving sweep efficiency and improving degree of reserve recovery. Since the micron-sized bubbles are easy to expand within larger pores, large-pore channels are blocked such that liquid diversion plays a profile control role, oil displacement by the water-gas dispersion system is an effective replacement way to continue to improve a recovery rate at a later stage of water flooding development. At present, there is an urgent need in the technical field for an apparatus that can perform oil displacement by effectively utilizing a water-gas dispersion system, so as to improve the recovery degree of crude oil.

SUMMARY OF THE INVENTION

The purpose of embodiments in the present specification is to provide a system and method of performing oil displacement by a water-gas dispersion system, which can perform oil displacement by effectively utilizing the water-gas dispersion system, so as to improve the recovery degree of crude oil.

The present specification provides a system for performing oil displacement by a water-gas dispersion system, the system for performing oil displacement includes a micro-bubble generation apparatus, a gas source, an ultrasonic oscillation controller, a protective barrel and a support; a first opening is provided in a top end of the protective barrel, into which an internal apparatus enters and from which the internal apparatus is extracted, the first opening is sealed by an end cover; a second opening communicating with a water flooding pipeline is provided in a side wall of the protective barrel, into which fluid flows and from which the fluid flows out; the micro-bubble generation apparatus is fixed within the protective barrel by the support; the gas source is connected with the micro-bubble generation apparatus through a gas pipeline, for transporting gas to the micro-bubble generation apparatus; and the ultrasonic oscillation controller is connected to the micro-bubble generation apparatus through a signal line, for controlling the micro-bubble generation apparatus to generate micro-bubbles.

In another embodiment of the system provided herein, the gas pipeline is provided with a main check valve for preventing reverse flow of gas within the gas pipeline.

In another embodiment of the system provided herein, the gas pipeline is provided with a single vibrator check valve at a location where the gas pipeline is connected with the micro-bubble generation apparatus.

In another embodiment of the system provided herein, the system for performing oil displacement further includes a monitoring probe fixed above the micro-bubble generation apparatus by a support, for monitoring gas flow conditions.

In another embodiment of the system provided herein, the support is a hollow structure, the support is integrally sealed and is sealingly connected with the micro-bubble generation apparatus and the end cover, and the signal line passes through an interior of the support.

In another embodiment of the system provided herein, the ultrasonic oscillation controller includes a bandwidth adjustment module.

In another embodiment of the system provided herein, the ultrasonic oscillation controller includes a current monitoring and display module for monitoring current of a control circuit.

In another embodiment of the system provided herein, the micro-bubble generation apparatus includes a trumpet-shaped conductor including an upper trumpet-shaped body and a lower cylindrical body;

the trumpet-shaped body is provided with a cavity with an upper opening, a microporous vibration sheet is fixedly connected to an upper end of the cavity, a microporous array of the microporous vibration sheet corresponds to the upper opening of the cavity, and a side wall of the cavity is further provided with a through hole through which outside gas enters into the cavity; and the cylindrical body is provided with a transducing ring and an electrode sheet, an outer side of the cylindrical body is insulated and sealed, and a connecting wire of the electrode sheet is led out through a steel pipe and is connected to an external ultrasonic oscillation controller.

In another embodiment of the system provided herein, the cavity is further provided therein with a closure cap having a size greater than or equal to the upper opening of the cavity.

In another embodiment of the system provided herein, one end of the closure cap is connected to an inner wall of the cavity by an articulation member.

In another embodiment of the system provided herein, the inner walls of both sides of the cavity that are close to the upper opening are further provided with a sealing ring for increasing the sealing of the closure cap to the upper opening.

In another embodiment of the system provided herein, the trumpet-shaped body is an integrally formed structure.

In another embodiment of the system provided herein, the trumpet-shaped body includes an upper end cover having a hollow annular structure, and the microporous vibration sheet is fixedly connected to an upper end of the upper end cover.

In another embodiment of the system provided herein, the transducing ring has a thickness ranging from 3 to 8 mm.

In another embodiment of the system provided herein, the trumpet-shaped body is further provided therein with pipelines communicating with the through hole on the cavity, for transporting outside gas into the cavity.

In another embodiment of the system provided herein, the pipelines are disposed symmetrically on both sides of the trumpet-shaped body.

In another embodiment of the system provided herein, the protective barrel is located on a ground, and the second opening in the side wall of the protective barrel includes a water inlet and a water outlet which are respectively connected with a water flooding pipe.

In another embodiment of the system provided herein, the protective cylinder is connected to the bottom of an oil pipe and is secured in a water flooding well by the oil pipe.

In another aspect, the embodiments in the present specification also provide a method of performing oil displacement base on the system of any of the embodiments described above, wherein the method includes: opening a water flooding valve on a water flooding pipeline to inject water, wherein water flow gets into a protective barrel through a second opening in a side wall of the protective barrel; opening a gas source, wherein gas enters a micro-bubble generation apparatus within the protective barrel through a gas pipeline; turning on an ultrasonic oscillation controller, which controls the micro-bubble generation apparatus to generate micro-bubbles through a signal line, to obtain the water-gas dispersion system; and the water-gas dispersion system flowing out from the second opening along with the water flow, and entering an oil layer through the water flooding pipeline.

One or more embodiments in the present specification provide a system and method of performing oil displacement by a water-gas dispersion system, wherein the system for performing oil displacement may include a protective barrel, a support, a micro-bubble generation apparatus, a gas source and an ultrasonic oscillation controller. The protective barrel may be connected into an existing water flooding system, water in the water flooding system may flow through the interior of the protective barrel, and micro-bubbles generated by the micro-bubble generation apparatus located within the protective barrel are dispersed in the water to form a water-gas dispersion system. Then, the water-gas dispersion system is transported to a corresponding stratum through the existing water flooding system along with the water flow, and the crude oil is developed. Therefore, by using the system for performing oil displacement provided in the specification, the water-gas dispersion system may be effectively implemented to perform oil displacement, so as to improve the recovery degree of crude oil.

BRIEF DESCRIPTION OF THE DRAWINGS

In order to more clearly illustrate the embodiments in the present specification or the technical solutions of the prior art, accompanying drawings required for describing the embodiments or the prior art will be briefly introduced below. Obviously, the accompanying drawings described below are only some embodiments described in this specification. For those skilled in the art, other drawings can also be obtained from these drawings without any creative labor. In the drawings.

DETAILED DESCRIPTION OF THE EMBODIMENTS

In order to make those skilled in the art better understand the technical solutions in the present specification, the technical solutions of one or more of the embodiments in the present specification will be clearly and completely described below with reference to drawings related to one or more of the embodiments in the present specification. Obviously, the described embodiments are only a part of embodiments in the present specification, but not all of them. Any other embodiments obtained by those skilled in the art based on one or more of the embodiments in the present specification without paying any creative labor should fall within the protection scope of the technical solutions of the embodiments in the present specification.

Figure 1:
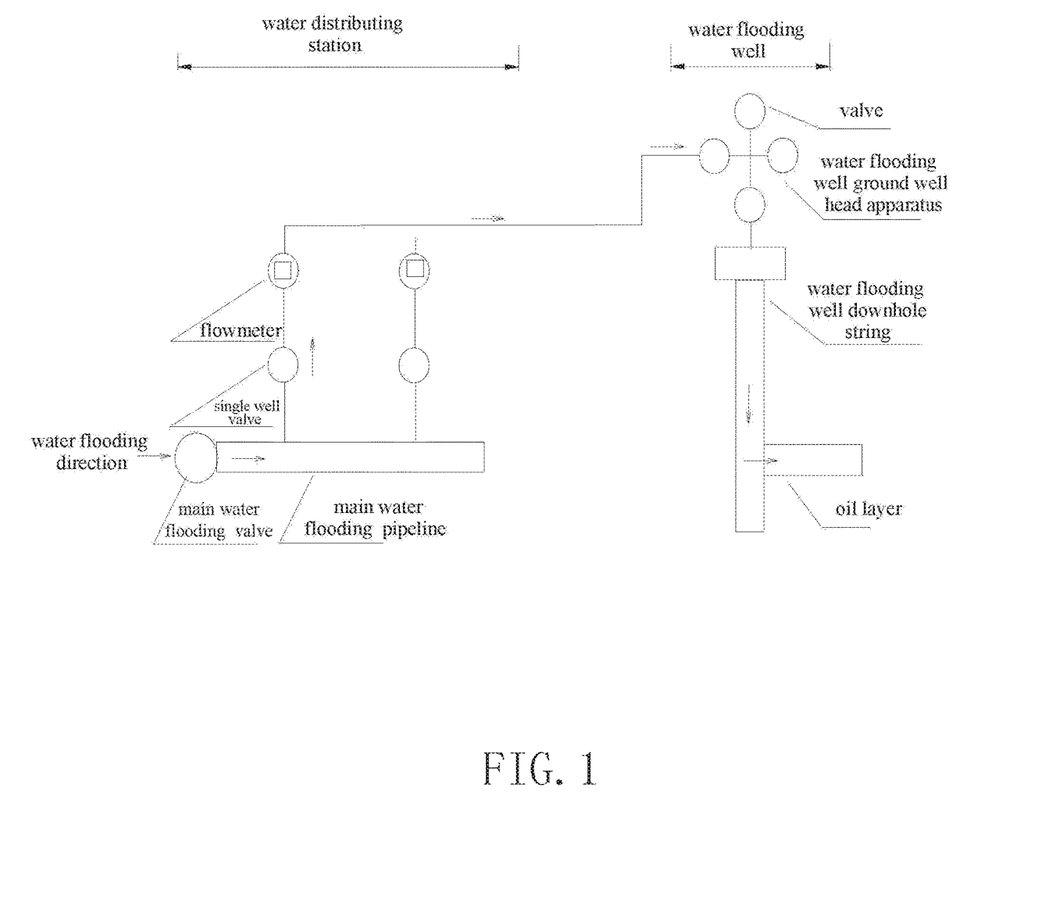
FIG. 1 is a structural schematic diagram of a water flooding system provided in this specification.

An embodiment of the specification provides a system for performing oil displacement by a water-gas dispersion system, in which an apparatus for generating micro-bubbles is added into an existing water flooding system, to obtain a water-gas dispersion system, such that the water-gas dispersion system is utilized for oil displacement to improve sweep efficiency and improve degree of reserve recovery. FIG. 1 represents a structural schematic diagram of an existing water flooding system.

Correspondingly, the system for performing oil displacement by a water-gas dispersion system of the embodiment of the present specification may include a micro-bubble generation apparatus, a gas source, an ultrasonic oscillation controller, a protective barrel and a support. A first opening is provided in a top end of the protective barrel, into which an internal apparatus enters and from which the internal apparatus is extracted, and the first opening may be sealed by an end cover. A second opening communicating with a water flooding pipeline is provided in a side wall of the protective barrel, into which fluid flows and from which the fluid flows out. The micro-bubble generation apparatus may be fixed within the protective barrel by the support. The gas source is connected with the micro-bubble generation apparatus through a gas pipeline and may be used for transporting gas to the micro-bubble generation apparatus. The ultrasonic oscillation controller may be connected to the micro-bubble generation apparatus through a signal line, for controlling the micro-bubble generation apparatus to generate micro-bubbles.

In specific implementation, the protective barrel may be connected into an existing water flooding system, water in the water flooding system may flow into the protective barrel through a second opening that is provided in a side wall of the protective barrel, and micro-bubbles generated by the micro-bubble generation apparatus are dispersed in the water to form a water-gas dispersion system. Then, the water-gas dispersion system flows out from the second opening along with water flow, and is transported to a corresponding stratum through the existing water flooding system, and the crude oil is developed.

Figure 2:
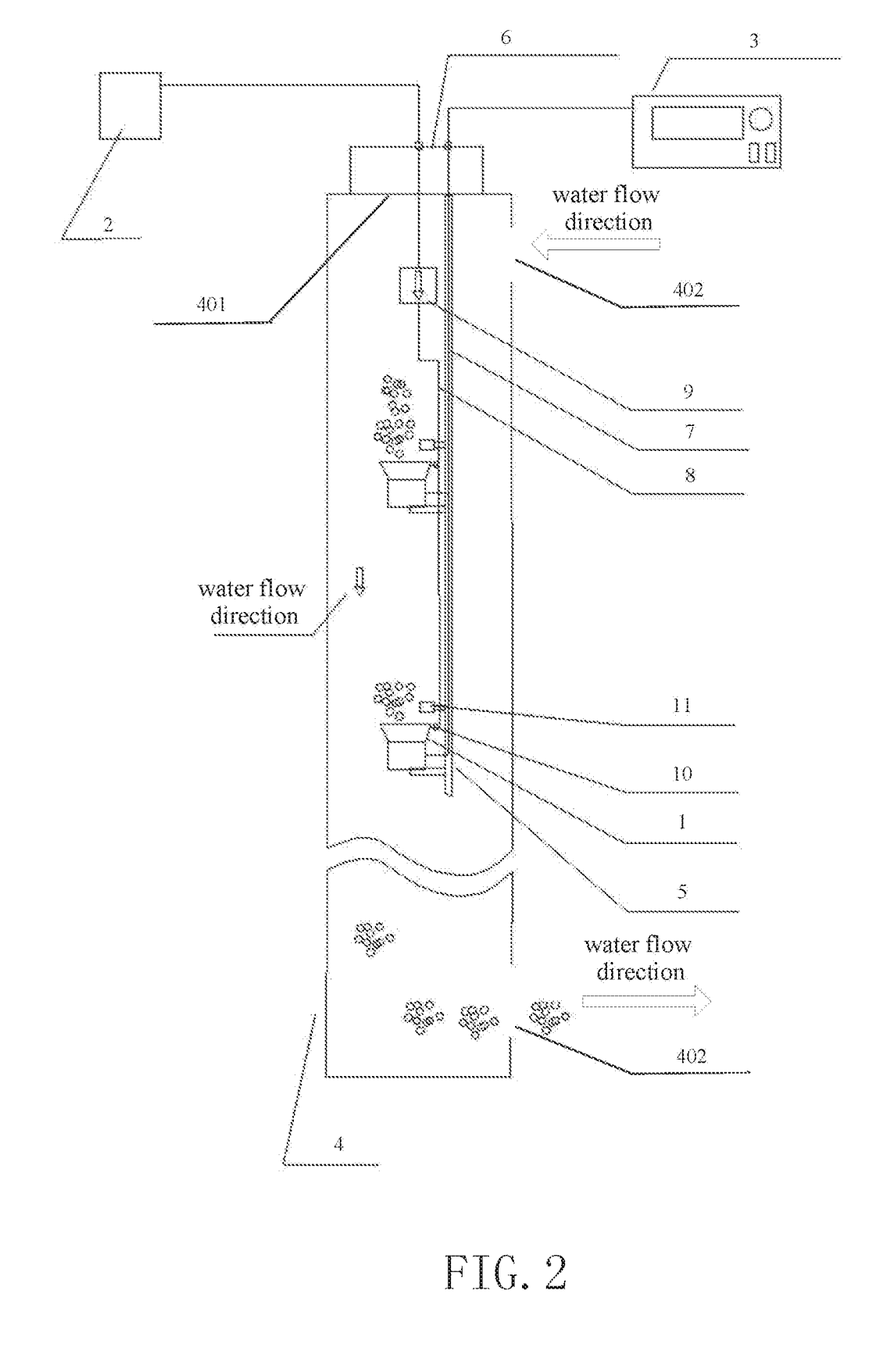
FIG. 2 is a structural schematic diagram of a system for performing oil displacement by a water-gas dispersion system provided in this specification.

FIG. 2 is a structural schematic diagram of a system for performing oil displacement by a water-gas dispersion system provided in one or more of the embodiments in the present specification. As shown in FIG. 2, in one embodiment of the system for performing oil displacement by a water-gas dispersion system provided in the present specification, the system for performing oil displacement may include a micro-bubble generation apparatus 1, a gas source 2, an ultrasonic oscillation controller 3, a protective barrel 4 and a support 5. A first opening 401 is provided in a top end of the protective barrel 4, into which an internal apparatus enters and from which the internal apparatus is extracted, and the first opening 401 may be sealed by an end cover 6. In some embodiments, the end cover 6 may be threadingly connected with the protective barrel 4 in order to ensure the sealing performance of the protective barrel 4 while taking out and putting in the internal apparatus.

The micro-bubble generation apparatus 1 may be fixed within the protective barrel 4 by the support 5. The ultrasonic oscillation controller 3 may be connected to the micro-bubble generation apparatus 1 through a signal line 7, to control the micro-bubble generation apparatus 1 to generate micro-bubbles. In some embodiments, the signal line 7 may include a portion outside the protective barrel and a portion inside the protective barrel, and the two portions may be connected at the end cover 6 by an inventive adaptor in order to ensure the sealing performance of the protective sleeve 4 at the end cover.

In one embodiment of the present specification, a pressure-resistant pipe may be fixed outside the signal line 7, and the signal line 7 may be sealed so as to prevent the signal line 7 from coming into contact with external fluid, thereby ensuring stability and safety of signal transmission. Preferably, the support 5 may be set as a hollow structure, the signal line 7 passes through an interior of the support 5, the support 5 is integrally sealed and is hermetically connected with the micro-bubble generation apparatus 1 and the end cover 6. By using the structure, the complexity of the apparatus may be further reduced while the stability and safety of the signal transmission may be ensured.

The gas source 2 is connected to the micro-bubble generation apparatus 1 through a gas pipeline 8, for supplying gas of preset pressure to the micro-bubble generation apparatus 1. In some embodiments, the signal line 8 may also include a portion inside the protective barrel and a portion outside the protective barrel, and the two portions are connected at the end cover 6 by an inventive adaptor in order to ensure the sealing performance of the protective sleeve 4 at the end cover.

A second opening 402 communicating with a water flooding pipeline is provided in a side wall of the protective barrel 4, into which fluid flows and from which the fluid flows out.

In specific implementation, the protective barrel 4 may be connected into an existing water flooding system in various ways, and the existing water flooding system communicates with the micro-bubble generation apparatus 1 through the second opening 402 in the side wall of the protective barrel 4. After respective apparatuses are connected, it is possible to smoothly inject water in accordance with an existing water flooding process, and to inject water in accordance with a preset water flooding amount, with corresponding pressure fluctuation being maintained in a normal water flooding state.

The water flow in the water flooding system enters the protective barrel 4 through the second opening 402, the gas source 2 is opened to transport gas to the micro-bubble generation apparatus 1 through a gas injection pipeline 8, and the gas is generated in the water in the form of bubbles.

The ultrasonic oscillation controller 3 is turned on to control the micro-bubble generation apparatus 1 to disperse the bubbles into micron-sized bubbles. The generated micron-sized bubbles are dispersed in the water to form a water-gas dispersion system which then flows out from the second opening 402 in the side wall of the protective barrel along with the water flow and is transported to a corresponding stratum to perform oil displacement.

With the structure of the above embodiment, an apparatus for generating micro-bubbles may be added into the existing water flooding system, to disperse the generated micro-bubbles into water, in order to obtain the water-gas dispersion system. Thus, oil displacement is performed by utilizing the water-gas dispersion system, so as to improve sweep efficiency and improve degree of reserve recovery.

In one embodiment of the present specification, a main check valve 9 may be provided on the gas pipeline 8, and the main check valve 9 may be used for preventing reverse flow of gas within the gas pipeline 8. In specific implementation, after the gas source 2 is turned on, the gas enters into the gas pipeline 8, and the main check valve 9 is opened when gas pressure is higher than water flooding pressure; otherwise, the main check valve 9 is closed. Therefore, gas backflow resulted from excessive water pressure around the micro-bubble generation apparatus is prevented, and the safety of the apparatus as a whole is effectively ensured.

In another embodiment of the present specification, a single vibrator check valve 10 may further be provided at a position where the gas pipeline 8 is connected to the micro-bubble generation apparatus 1, for preventing reverse flow of gas within the micro-bubble generation apparatus 1. Gas backflow is further prevented, and water at the periphery of the micro-bubble generation apparatus is prevented from entering the micro-bubble generation apparatus, thereby effectively protecting the micro-bubble generation apparatus.

In another embodiment of the present specification, the system may further include a monitoring probe 11, which may be fixed above the micro-bubble generation apparatus 1 (preferably, directly above the micro-bubble generation apparatus 1) by a support 5, for monitoring gas flow conditions. The monitoring probe 11 may be fixed, for example, at 2 cm above a vibration surface of the micro-bubble generation apparatus 1, and a resonance frequency thereof may be set to be consistent with a vibration frequency of the micro-bubble generation apparatus. When the micro-bubble generation apparatus maintains a vibration state, the monitoring probe may receive acoustic wave that the micro-bubble generation apparatus vibrates, determine the vibration state of the micro-bubble generation apparatus by analyzing change in amplitude of the received acoustic wave, and analyze change in ambient pressure and gas production capacity at a position where the micro-bubble generation apparatus is located by means of acoustic wave velocity change. Accordingly, whether the micro-bubble generation apparatus is intact and whether the gas flow condition at the position thereof is normal are monitored effectively.

In one embodiment of the present specification, the ultrasonic oscillation controller 3 may include a bandwidth adjustment module. For example, a frequency of the micro-bubble generation apparatus may be set in the range of 100 to 300 kHz, and a core frequency may be selected according to conditions such as gas flow rate and the like, for example, 200 kHz. In consideration of a large amount of impurities in a fluid environment and interference to the resonance frequency due to presence of an adsorption phenomena, an adjusting bandwidth of ±20 kHz may be increased in a controller circuit. Therefore, the micro-bubble generation apparatus may be made free from interference to the vibration frequency caused by the environment, the adaptability of the micro-bubble generation apparatus to an external complex environment may be improved, and effective generation of micro-bubbles may be ensured.

In one embodiment of the present specification, the ultrasonic oscillation controller 3 may further include a current monitoring and display module for monitoring current of a control circuit. In general, when the micro-bubble generation apparatus operates effectively, the current is in the range of 0.2 to 0.3 A, and a heating value thereof is normal; if the current is higher than this range, intermittent power supply or other similar ways shall be adopted; and if the current is displayed as 0, the micro-bubble generation apparatus is disabled and maintenance is required. By adding a current monitoring and display module into the control circuit of the ultrasonic oscillation controller, the current in the control circuit may be effectively monitored, to monitor and feed back a heating state in real time to adjust the power supply mode, and whether the ultrasonic oscillation controller operates normally or not may be monitored in time.

Figure 3:
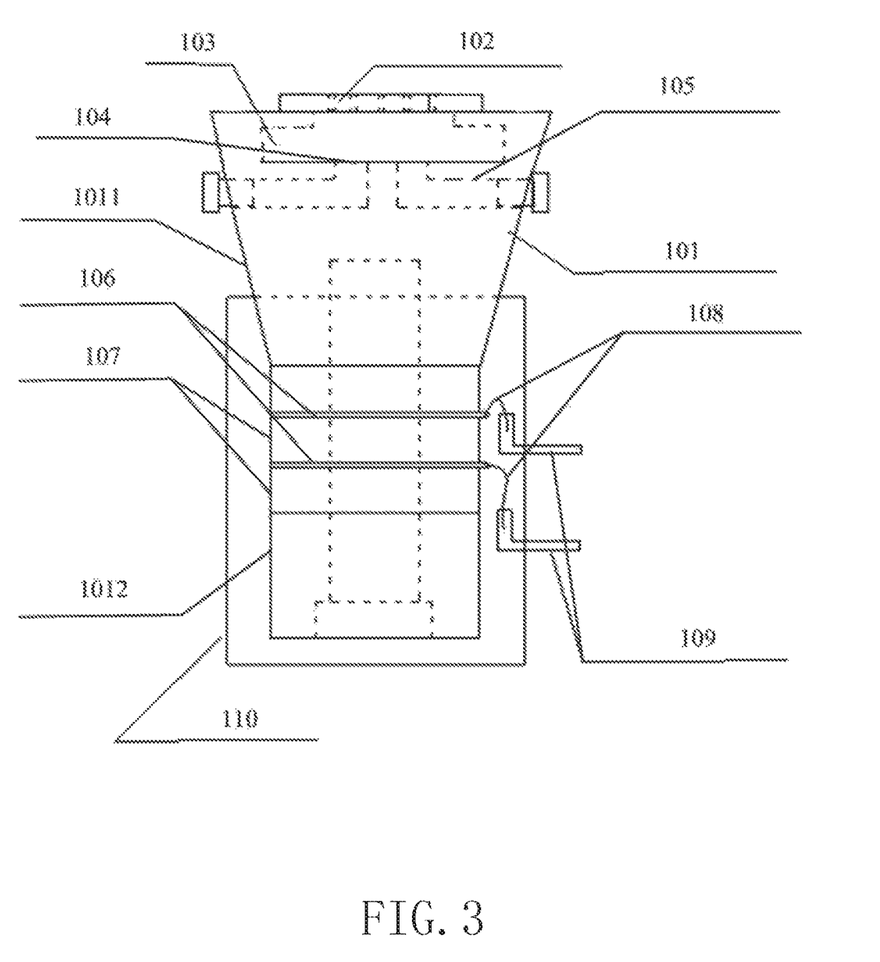
FIG. 3 is a structural schematic diagram of a micro-bubble generation apparatus provided in this specification.

FIG. 3 is a structural schematic diagram of a micro-bubble generation apparatus provided in one or more of the embodiments in the present specification. As shown in FIG. 3, the micro-bubble generation apparatus 1 may include a trumpet-shaped conductor 101, which may include an upper trumpet-shaped body 1011 and a lower cylindrical body 1012. The trumpet-shaped body 1011 is provided with a cavity 103 with an upper opening, a microporous vibration sheet 102 is fixedly connected to an upper end of the cavity 103, a microporous array of the microporous vibration sheet 102 corresponds to the upper opening of the cavity 103. A through hole 104 through which outside gas enters into the cavity is further provided in a side wall of the cavity 103. The cylindrical body 1012 is provided with a transducing ring 107 and an electrode sheet 106, an outer side of the cylindrical body 1012 is insulated and sealed, and a connecting wire 108 of the electrode sheet 106 is led out through a steel pipe 109 and is connected to an external ultrasonic oscillation controller 3.

In some embodiments, the micro-bubble generation apparatus 1 may include the trumpet-shaped conductor 101, which may include the upper trumpet-shaped body 1011 and the lower cylindrical body 1012.

The cavity 103 may be disposed at an upper portion of the trumpet-shaped body 1011, and the microporous vibration sheet 102 is fixedly connected to an upper end of the cavity 103, and a microporous array is distributed in the center of the microporous vibration sheet 102. The microporous array may include a plurality of vent holes of 5 to 10 μm, for passage of gas to generate bubbles. In specific implementation, the microporous vibration sheet 102 may be adhered or welded on an end face of the trumpet-shaped body, an edge part of the microporous vibration sheet 102 is in close contact with the end face, and the microporous array in the center of the microporous vibration sheet 102 corresponds to the cavity 103.

By designing a cavity at a trumpet opening and fixedly connecting a microporous vibration sheet at the upper end of the cavity, gas can pass through the bottom of the vibration sheet under pressure to form bubbles. Therefore, the sealing effect of the gas and the effect of isolating the gas from the water are ensured. In addition, even if an installation position of the microporous vibration sheet is slightly deviated, the effective passage of the gas is not affected, and the complexity of the structural design is further reduced.

In one or more embodiments in the present specification, the trumpet-shaped body may be an integrally formed structure, and the cavity is provided in an upper portion of the trumpet-shaped body. Closure property of the cavity may be improved by using the integrally formed structure. The sealing effect of the gas and the effect of isolating the gas from the water are further ensured.

Figure 4:
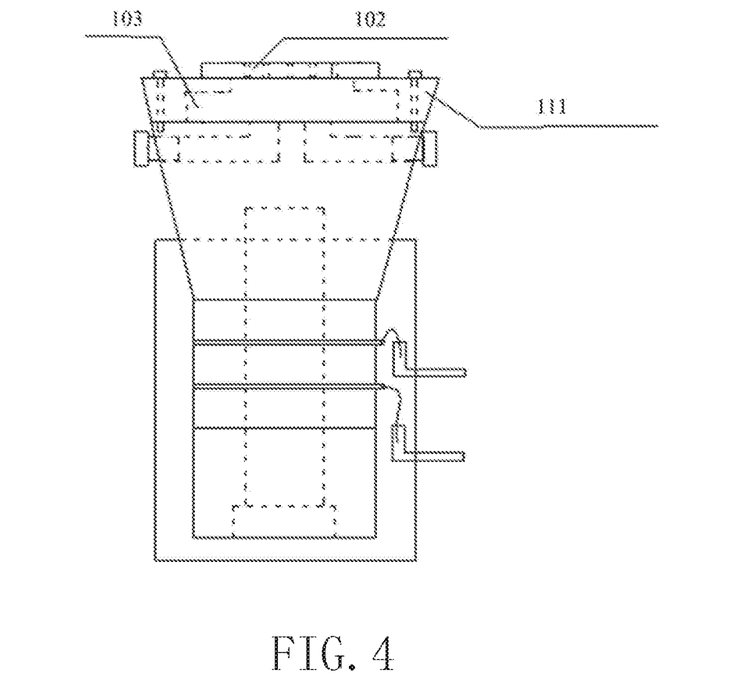
FIG. 4 is a structural schematic diagram of another micro-bubble generation apparatus provided in this specification.
Figure 5:
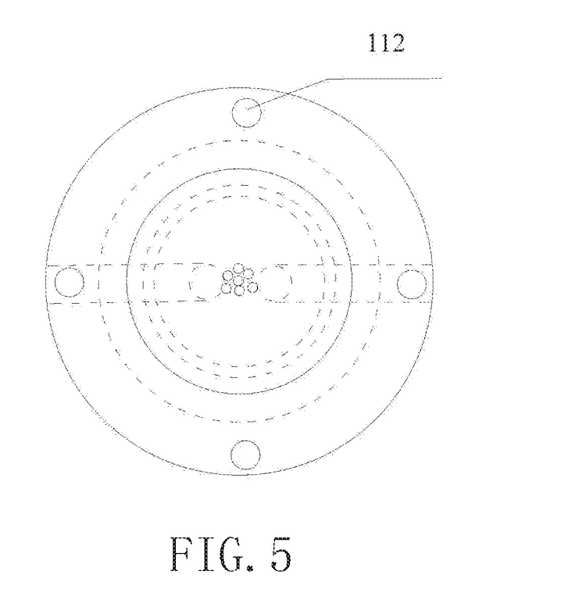
FIG. 5 is a top view of another micro-bubble generation apparatus provided in this specification.

FIG. 4 represents a structural schematic diagram of the micro-bubble generation apparatus provided in another embodiment in the present specification, and FIG. 5 represents a top view of the structure shown in FIG. 4. As shown in FIGS. 4 and 5, the trumpet-shaped body may also be provided in a two-segment structure, an upper end cover 111 may be provided on an upper end of the trumpet-shaped body, the upper end cover 111 is a hollow annular structure and may be fixed on a lower half portion of the trumpet-shaped body by a bolt 112 or the like, thereby forming a cavity structure on the upper end of the trumpet-shaped body. The cavity structure is formed by using a removable hollow upper end cover, such that the overall design of the apparatus become simpler. Accordingly, the microporous vibration sheet 102 may be fixed at the upper end of the upper end cover, and the microporous array in the center of the microporous vibration sheet 102 corresponds to the cavity 103.

As shown in FIG. 3, the side wall of the cavity 103 may be further provided with a through hole 104 for allowing outside gas to enter the cavity. In specific implementation, the outside gas with preset pressure may be transported into the cavity through the through hole 104, and the gas in the cavity passes upwards through the microporous vibration sheet 102 under pressure, to form bubbles.

In specific implementation, the through hole may be provided in the side wall of the cavity and is communicated with external environment, and an external gas pipeline 8 may be connected with the through hole by threaded connection or other similar ways. Preferably, in one embodiment of the present specification, a pipeline 105 for allowing external gas to flow into the cavity may be provided on the trumpet-shaped body in the lower part of the cavity, and the pipeline 105 communicates with the through hole 104 in the cavity. By providing the pipeline communicating with the through hole on the trumpet-shaped body, the position of the through hole may be provided more conveniently. For example, the through hole may be provided at a lower end of the cavity to reduce influence on the generation of bubbles caused by left and right gas flows of gas entering into the cavity. Then, the through hole is further communicated with the external gas pipeline 8 through the pipeline 105.

The through hole may be provided in plural, and correspondingly, the pipeline may also be provided in plural. In one embodiment of the present specification, the pipelines may be disposed symmetrically on left and right sides of the trumpet-shaped body, and after the gas enters the cavity through the pipeline on one of the left and right sides, in the case that the pipeline on the other side is blocked, the gas flows out along the microporous array of the microporous vibration sheet. When the pressure of the gas flowing into the cavity is abnormal, the pipeline on the other side may also be opened to conveniently discharge the gas. In addition, the pipelines are disposed on both sides, which also facilitates installation of the apparatus.

The cylindrical body 1012 is provided with an electrode sheet 106 and a transducing ring 107. The electrode sheet 106 may be connected to an external ultrasonic oscillation controller 3 through a connecting wire 108. In specific implementation, the connecting wire 108 may be connected to the signal line 7, thereby achieving the electrical connection of the electrode sheet 106 and the ultrasonic oscillation controller 3. Of course, the connecting wire and the signal line may also be of an integrally formed structure in specific implementation. The ultrasonic oscillation controller applies a voltage to the electrode sheet, thereby controlling the transducing ring to oscillate. In some embodiments, a material of the transducing ring may be piezoelectric ceramics, and the electrode sheet may be a metal material with good conductivity, such as a copper sheet or an aluminum sheet or the like.

In specific implementation, the number of the electrode sheet and of the transducing ring may be one or more, which together constitute an energy transducer of the micro-bubble generation apparatus, for converting electrical energy into mechanical energy. A fixing block may be provided at, e.g., a lower end of the energy transducer, and then the electrode sheet and the transducing ring are fixed by a fixing screw. Certainly, in specific implementation, the energy transducer may be fixed in other ways as well, which is not limited here. By using the above structure design, the thickness of the transducing ring may be set according to the actual needs, and is no longer limited by the structure of the microporous vibration sheet to be driven by the transducing ring, so that high-power ultrasonic vibration may be realized.

Preferably, in one embodiment of the present specification, the thickness of the transducing ring may be set as any value in the range of 3 to 8 mm, and the corresponding vibration frequency may be in the range of 100 to 300 kHz, so that high-pressure resistance of the apparatus may be improved while satisfying the operating efficiency. A corresponding matching control circuit can meet the requirements that an input voltage is 220V AC and an output voltage is 24V DC. The operating power of a single apparatus can reach 60 W or higher, and it is achievable that multiple apparatuses work in parallel, thereby greatly improving the gas production capacity of the apparatus.

The outer side of the cylindrical body 1012 may be insulated and sealed. After the sealing, the connecting wire 108 of an electrode may be led out through a steel pipe 109. By the above described sealed structure design, a short circuit phenomenon does not occur even if the whole apparatus is immersed in water. In some embodiments, for example, a rigid sealant 110 may be used to seal the outer side of the body so as to seal the transducing ring and the electrode sheet. A transducing ring structure is provided on a cylindrical body and the transducing ring is sealed with a rigid sealant, while can improve the waterproof performance of the apparatus and meanwhile can also effectively ensure a vibration effect of the transducing ring. In addition, the adaptability of the whole apparatus to the external air pressure may be further improved. For example, an external pressure difference that the whole apparatus bears may be up to 20 MPa or more, and accordingly, an operating well depth of the apparatus may be increased to 2000 m or deeper, thereby greatly improving the adaptability of the whole apparatus to a complex downhole environment in practical industrial application.

In specific implementation, the whole apparatus may be immersed in water, and a voltage may be applied to an electrode 106 by an external ultrasonic oscillation controller, thereby controlling the transducing ring to oscillate. Oscillation energy of the transducing ring is transmitted to the microporous vibration sheet 102 along the trumpet-shaped conductor 101, to drive the microporous vibration sheet 102 to perform high-frequency continuous oscillation. The oscillation energy may be concentrated in the center of the microporous vibration sheet by means of the trumpet-shaped structure design.

Meanwhile, outside gas with certain preset pressure may be transported into the cavity 103 through the pipeline 105, and the pipeline 105 and the external gas pipeline 8 may be connected by screw thread.

The microporous vibration sheet 102 performs high-frequency continuous oscillation to form an abnormal pressure region in a certain space above and below the microporous array of the microporous vibration sheet 102, in which region a reciprocating high-pressure and low-pressure alternation is presented, and a gas-liquid interface above and below the microporous vibration sheet 102 is destroyed.

Bubbles passing through the microporous array of the microporous vibration sheet 102 are affected by the reciprocating high-pressure and low-pressure alternation generated by the high-frequency continuous oscillation of the microporous vibration sheet 102, and are dispersed into a plurality of small bubbles by elastic energy. The initial bubbles of 30 to 200 μm are broken to generate micro bubbles of 1 to 50 μm, thereby forming micron-sized bubbles.

In the micro-bubble generation apparatus provided in the above embodiment of the present specification, the transducing ring and the electrode sheet are fixed on the cylindrical body, and then the oscillation energy of the transducing ring is transmitted to the microporous vibration sheet through a trumpet-shaped structure body, thereby effectively driving the microporous vibration sheet to vibrate at a high frequency. Accordingly, the thickness of the transducing ring is no longer limited by the structure of a vibrating sheet to be driven by the transducing ring, so that the voltage applied to the transducing ring may be increased, the operating power of the apparatus may be increased, and thus the production of micro-bubbles may be greatly increased.

At the same time, the outer side of the cylindrical body is insulated and sealed so as to seal the transducing ring and the electrode sheet, and then an electrode line is led out through a steel pipe. Therefore, the waterproof performance of the whole apparatus may be improved, and a short circuit phenomenon does not occur even when the whole ultrasonic micro-bubble generation apparatus is placed in water, and thus the use safety of the apparatus is greatly ensured.

Furthermore, by designing a cavity at a trumpet opening and fixedly connecting a microporous vibration sheet at the upper end of the cavity, gas can pass through the bottom of the vibration sheet under pressure, to form bubbles through the vent hole. Thus, the sealing effect of the gas and the effect of isolating the gas from the water are ensured, and the required accuracy of the position of the microporous vibration sheet is reduced.

Figure 6:
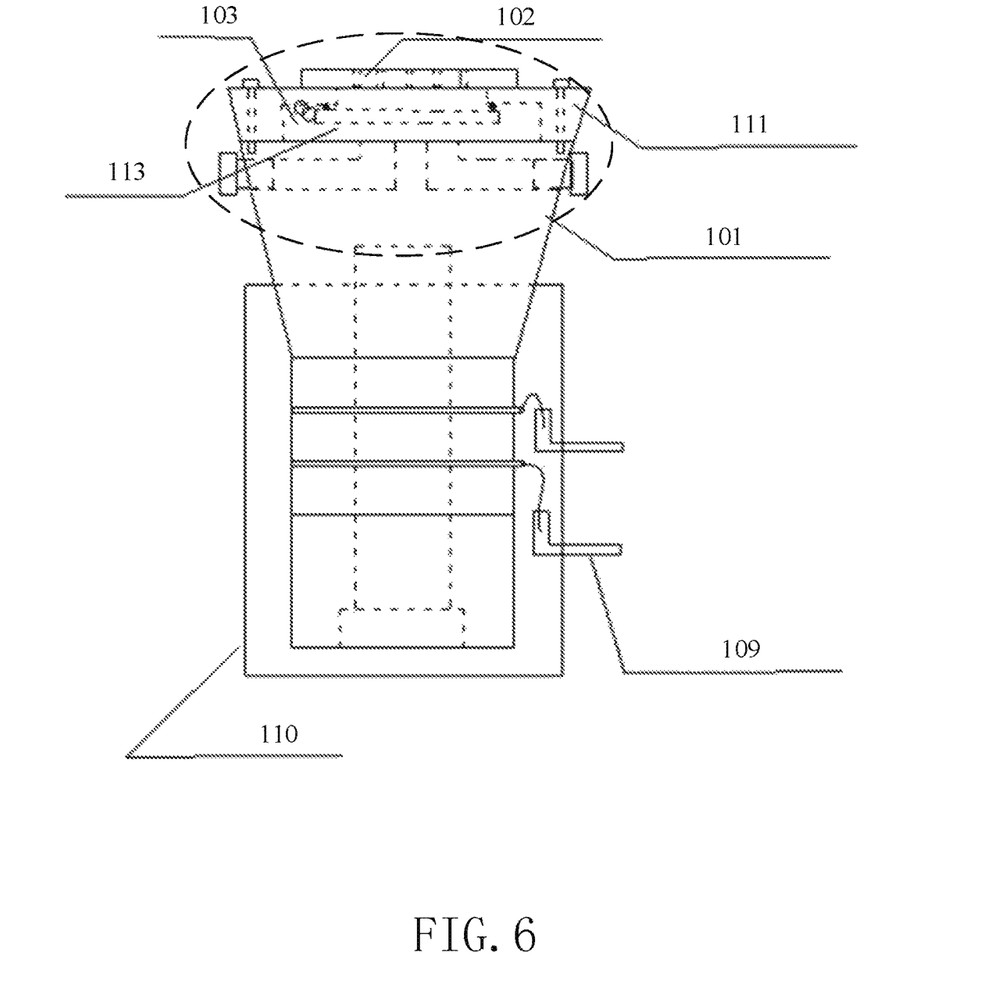
FIG. 6 is a structural schematic diagram of another micro-bubble generation apparatus provided in this specification.

FIG. 6 represents a structural schematic diagram of the micro-bubble generation apparatus described in another embodiment in the present specification. As shown in FIG. 6, the cavity is further provided therein with a closure cap 113 having a size greater than or equal to an upper opening of the cavity 103.

When the pressure of the air transported from the outside suddenly increases, the gas enters the cavity, a pressure generated by gas pressure difference is greater than a gravity of the closure cap, and the closure cap seals the upper opening of the cavity upwards, thus protecting the microporous vibration sheet from being damaged by high pressure gas. If the pressure is stable (for example, a pressure difference between the gas and outside water phase is less than 0.3 MPa), the closure cap is opened under its own weight, so that the gas flows out from the microporous array. In encounter of fluctuation of high pressure difference of the gas, the closure cap may be lifted by the gas again, to seal the upper end. Accordingly, the closure cap is provided within the cavity, so that the vibration sheet is protected by the closure cap under the condition of a large pressure difference, and at the same time, the sealing performance of the whole apparatus in gas injection at the time of failure of the microporous vibration sheet may be improved.

Figure 7:
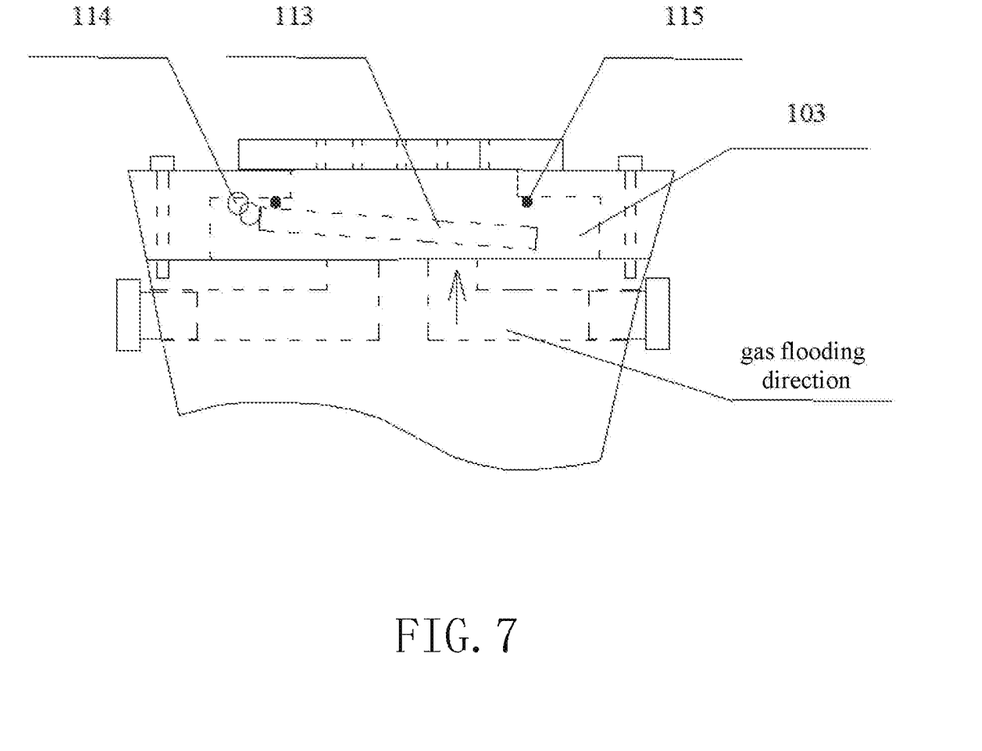
FIG. 7 is an enlarged partial view of another micro-bubble generation apparatus provided in this specification.

FIG. 7 represents an enlarged view of the structure illustrated in the dotted circle of FIG. 6. As shown in FIG. 7, in one embodiment in the present specification, the closure cap 113 may be connected to an inner wall of the cavity 103 by an articulation member 114, and the upper opening of the cavity can be sealed more accurately. Of course, in specific implementation, the closure cap 113 may be connected to the inner wall of the cavity 103 also by other means that may be lifted and lowered. Further, in one or more embodiments in the present specification, the inner walls of both sides of the cavity that are close to the upper opening may be further provided with a sealing ring 115, thereby further improving the sealing effect of the closure cap to the upper opening of the cavity.

The micro-bubble generation apparatus provided in one or more of the above embodiments in the present specification has good waterproof performance, and can safely generate micro-bubbles in the water phase of both ground industrial conditions and wellbore conditions. Meanwhile, the power of the ultrasonic micro-bubble generation apparatus may be greatly increased, thereby improving the gas production capacity. Moreover, when the gas pressure difference dramatically fluctuates, not only protection of the vibration sheet can be achieved, but also the sealing performance of the whole apparatus in gas injection at the time of failure of the vibration sheet can be ensured.

Figure 8:
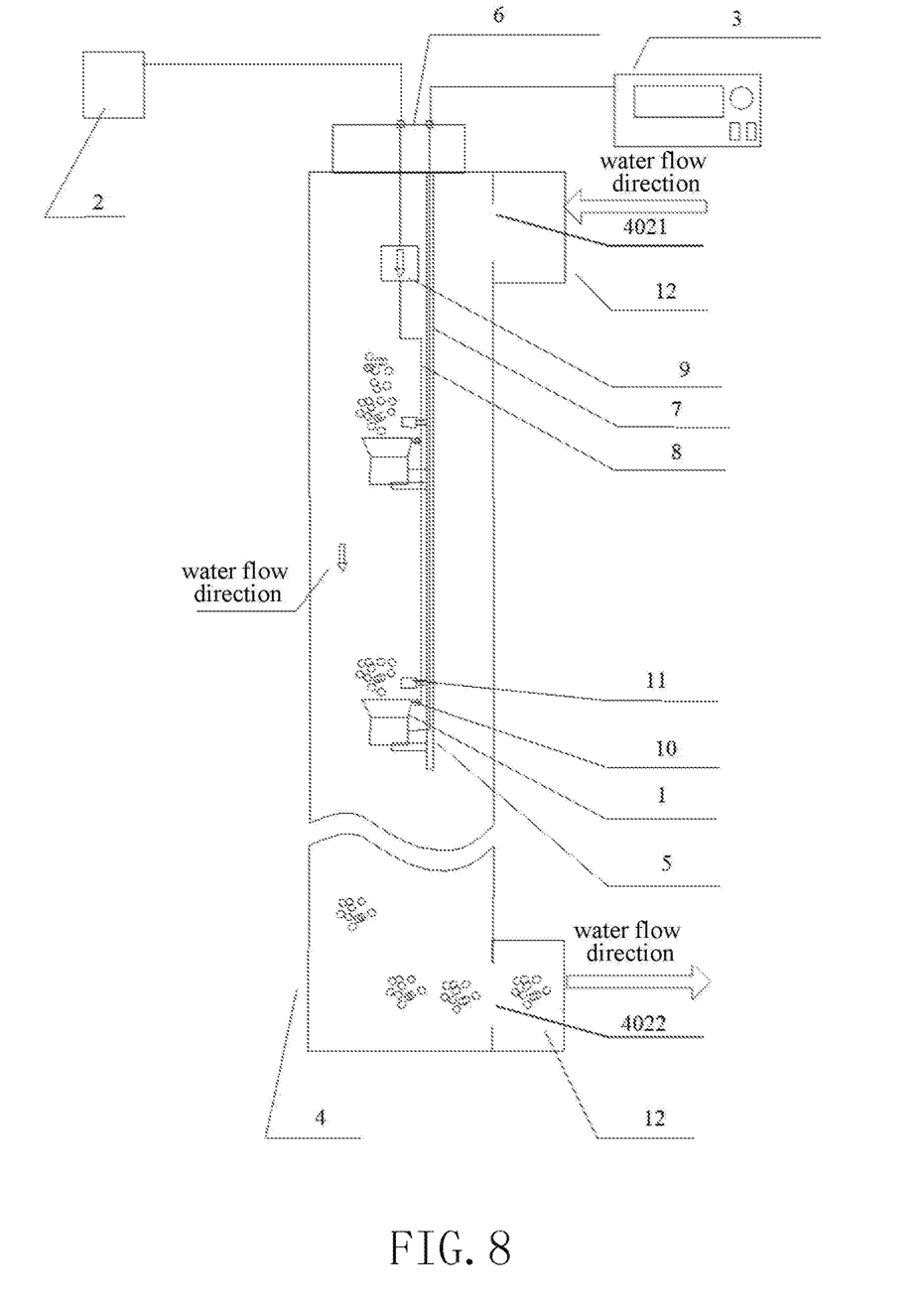
FIG. 8 is a structural schematic diagram of another system for performing oil displacement by a water-gas dispersion system provided in this specification.

FIG. 8 represents a structural schematic diagram of the system for performing oil displacement by a water-gas dispersion system provided in one embodiment in the present specification. As shown in FIG. 8, the protective barrel 4 is located on the ground, and the second opening in the side wall of the protective barrel 4 may include a water inlet 4021 and a water outlet 4022 which are respectively connected with a water flooding pipe 12. In some embodiments, the protective barrel 4 may be installed in a water distributing station or near a well head of a water flooding well, in order for ease of installation and maintenance.

In specific implementation, the water inlet and the water outlet may be connected to a water flooding pipe in the water flooding pipeline by, for example, a flange. The water in the water flooding pipe can enter the protective barrel through the water inlet, and the micro-bubbles generated by the micro-bubble generation apparatus enter the water to form a water-gas dispersion system, which then flows out along the water outlet with the water flow, and enters an oil layer through an existing water flooding system for oil displacement.

Figure 9:
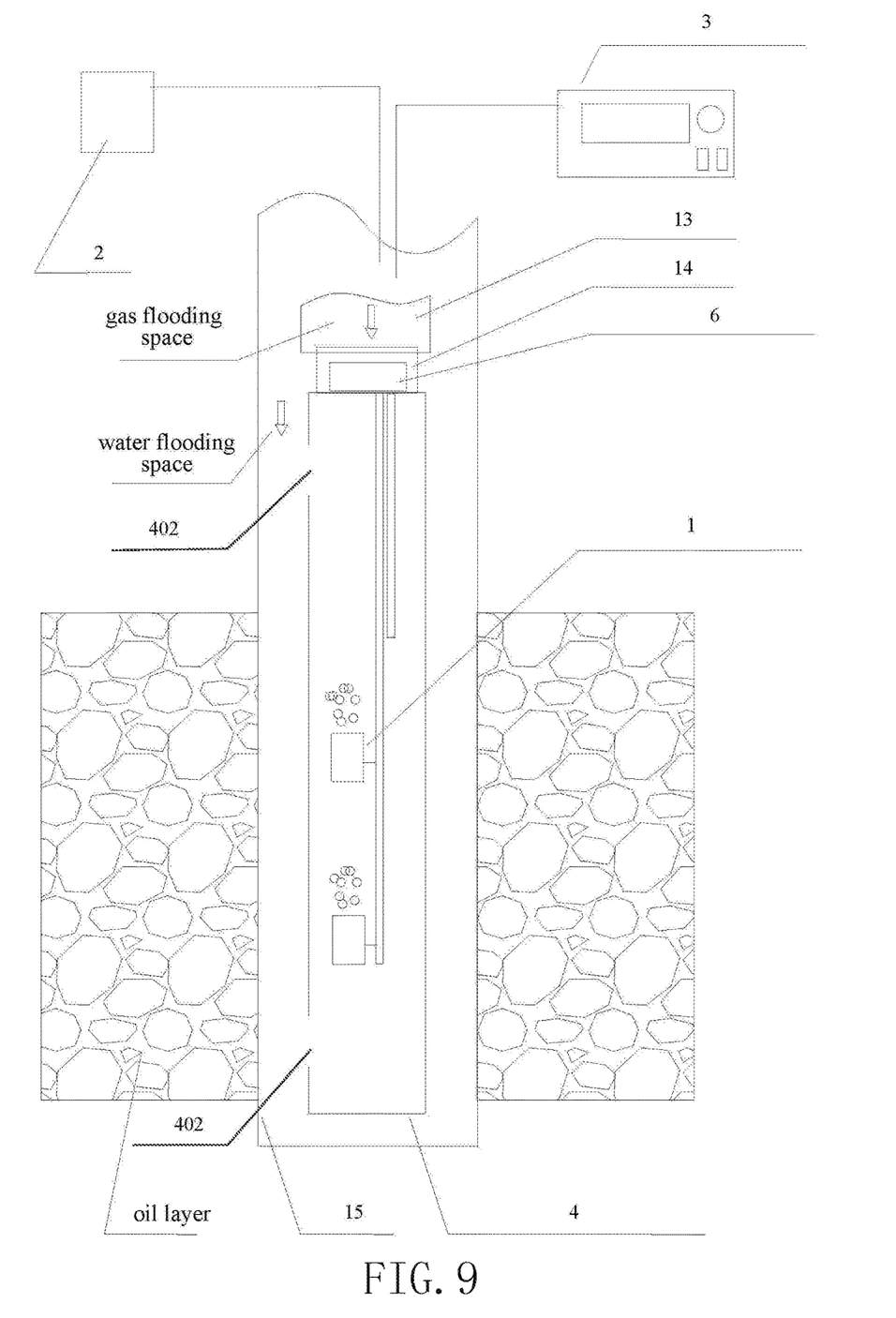
FIG. 9 is a structural schematic diagram of another system for performing oil displacement by a water-gas dispersion system provided in this specification.

FIG. 9 represents a structural schematic diagram of the system for performing oil displacement by a water-gas dispersion system provided in another embodiment in the present specification. As shown in FIG. 9, the protective cylinder 4 is connected to the bottom of an oil pipe 13 and is secured in a water flooding well by the oil pipe 13. The protective barrel 4 may be disposed in the water flooding well, and the protective barrel 4 and the bottom of the oil pipe 13 may be connected by, for example, a screw thread or the like. As shown in FIG. 9, a protruding structure 14 with an external thread may be provided at a position where the protective barrel 4 and the oil pipe 13 are connected, the protruding structure 14 is threadingly connected with the oil pipe, and the protective barrel is fixed in the water flooding well through the oil pipe. By fixing the protective barrel within the water flooding well, separate protective barrels and internal apparatuses may be set for different oil layers, so that the corresponding bubble quantity thereof may be adjusted for the different oil layers, and the practicability of the whole system may be further improved.

In specific implementation, water is injected into an annulus between the oil pipe 13 and a cashing 15 in the water flooding well through a water flooding pipe, and the portions of the gas pipeline and of the signal line that are located on the outer side of the protective barrel can pass through the oil pipe, and then are connected to portions on the inner side of the protective barrel through the end cover. The second opening 402 in the side wall of the protective barrel can allow water to get in and out of the protective barrel 4, and the micro-bubbles generated by the micro-bubble generation apparatus 1 enter the water to form a water-gas dispersion system, and then enter an oil layer along with the water flow, for oil displacement.

The present specification also provides a method of performing oil displacement based on the system for performing oil displacement by a water-gas dispersion system according to one or more of the embodiments described above, the method may include: opening a water flooding valve on a water flooding pipeline to inject water, wherein water flow gets into a protective barrel through a second opening in a side wall of the protective barrel; opening a gas source, wherein gas enters a micro-bubble generation apparatus within the protective barrel through a gas pipeline; turning on an ultrasonic oscillation controller, which controls the micro-bubble generation apparatus to generate micro-bubbles through a signal line, to obtain the water-gas dispersion system; and the water-gas dispersion system flowing out from the second opening along with the water flow, and entering an oil layer through the water flooding pipeline.

In specific implementation, after respective apparatuses are connected, it is possible to smoothly inject water in accordance with an existing water flooding process, and to inject water in accordance with a preset water flooding amount, with corresponding pressure fluctuation being maintained in a normal water flooding state.

The water flow in the water flooding system enters the protective barrel through the second opening, a gas source apparatus is opened to transport gas to the micro-bubble generation apparatus through a gas injection pipeline, and the gas is generated in the water in the form of bubbles. The ultrasonic oscillation controller is turned on to control the micro-bubble generation apparatus to disperse the bubbles into micron-sized bubbles. The generated micron-sized bubbles are dispersed in the water to form a water-gas dispersion system, which flows out from the second opening in the side wall of the protective barrel along with the water flow and is transported to a corresponding stratum to perform oil displacement.

By utilizing the system and the method provided in the above embodiments in the present specification, the protective barrel may be connected into an existing water flooding system, water in the water flooding system may flow through the protective barrel, and micro-bubbles generated by the micro-bubble generation apparatus located within the protective barrel are dispersed in the water to form a water-gas dispersion system. Then, the water-gas dispersion system is transported to a corresponding stratum through the existing water flooding system along with the water flow, and the crude oil is developed. Thereby, oil displacement is performed effectively by utilizing the water-gas dispersion system, so as to improve the recovery degree of crude oil.

Various embodiments in the specification are described in a progressive manner, and the same or similar parts among the various embodiments may be referred to each other, and each embodiment focuses on the differences from other embodiments. In the description of the present specification, the description of reference terms "one embodiment", "some embodiments", "example", "specific example" or "some examples" and the like mean that specific features, structures, materials or characteristics described by combining the embodiment or example are included in at least one embodiment or example in the present specification. In the present specification, exemplary expression of the above terms does not necessarily refer to the same embodiment or example. Moreover, the described specific features, structures, materials or characteristics may be combined in a suitable manner in any one or more of the embodiments or examples. Furthermore, those skilled in the art may combine different embodiments or examples described in the present specification and features of the different embodiments or examples in the case that they are not contradictory to each other. The accompanying drawings of the specification of the present application are merely schematic drawings, and do not represent the actual structure of the various components.

The above described are merely examples of one or more embodiments in the present specification, and are not intended to limit one or more embodiments in the present specification. For those skilled in the art, various modifications and variations may be made to one or more embodiments in the present specification. Any modifications, equivalents, improvements, etc. made within the spirit and scope of the present application are intended to be included within the scope of the claims of the present application.

The invention claimed is:

1. A system for performing oil displacement by a water-gas dispersion system, wherein the system for performing oil displacement includes a micro-bubble generation apparatus, a gas source, an ultrasonic oscillation controller, a protective barrel and a support;
   a first opening is provided in a top end of the protective barrel, into which an internal apparatus enters and from which the internal apparatus is extracted, the first opening is sealed by an end cover;
   a second opening communicating with a water flooding pipeline is provided in a side wall of the protective barrel, into which fluid flows and from which the fluid flows out;
   the micro-bubble generation apparatus is fixed within the protective barrel by the support;
   the gas source is connected with the micro-bubble generation apparatus through a gas pipeline, for transporting gas to the micro-bubble generation apparatus; and
   the ultrasonic oscillation controller is connected to the micro-bubble generation apparatus through a signal line, for controlling the micro-bubble generation apparatus to generate micro-bubbles.

2. The system for performing oil displacement by a water-gas dispersion system according to claim 1, wherein the gas pipeline is provided with a main check valve for preventing reverse flow of gas within the gas pipeline.

3. The system for performing oil displacement by a water-gas dispersion system according to claim 2, wherein the gas pipeline is provided with a single vibrator check valve at a location where the gas pipeline is connected with the micro-bubble generation apparatus.

4. The system for performing oil displacement by a water-gas dispersion system according to claim 1, wherein the system for performing oil displacement further includes a monitoring probe fixed above the micro-bubble generation apparatus by a support, for monitoring gas flow conditions.

5. The system for performing oil displacement by a water-gas dispersion system according to claim 1, wherein the support is a hollow structure, the support is integrally sealed and is sealingly connected with the micro-bubble generation apparatus and the end cover, and the signal line passes through an interior of the support.

6. The system for performing oil displacement by a water-gas dispersion system according to claim 1, wherein the ultrasonic oscillation controller includes a bandwidth adjustment module.

7. The system for performing oil displacement by a water-gas dispersion system according to claim 1, wherein the ultrasonic oscillation controller includes a current monitoring and display module for monitoring current of a control circuit.

8. The system for performing oil displacement by a water-gas dispersion system according to claim 1, wherein the micro-bubble generation apparatus includes a trumpet-shaped conductor including an upper trumpet-shaped body and a lower cylindrical body;
   the trumpet-shaped body is provided with a cavity with an upper opening, a microporous vibration sheet is fixedly connected to an upper end of the cavity, a microporous array of the microporous vibration sheet corresponds to the upper opening of the cavity, and a side wall of the cavity is further provided with a through hole through which outside gas enters into the cavity; and
   the cylindrical body is provided with a transducing ring and an electrode sheet, an outer side of the cylindrical body is insulated and sealed, and a connecting wire of the electrode sheet is led out through a steel pipe and is connected to an external ultrasonic oscillation controller.

9. The system for performing oil displacement by a water-gas dispersion system according to claim 8, wherein the cavity is further provided therein with a closure cap having a size greater than or equal to the upper opening of the cavity.

10. The system for performing oil displacement by a water-gas dispersion system according to claim 9, wherein one end of the closure cap is connected to an inner wall of the cavity by an articulation member.

11. The system for performing oil displacement by a water-gas dispersion system according to claim 9, wherein the inner walls of both sides of the cavity that are close to the upper opening are further provided with a sealing ring for increasing the sealing of the closure cap to the upper opening.

12. The system for performing oil displacement by a water-gas dispersion system according to claim 8, wherein the trumpet-shaped body is an integrally formed structure.

13. The system for performing oil displacement by a water-gas dispersion system according to claim 8, wherein the trumpet-shaped body includes an upper end cover having a hollow annular structure, and the microporous vibration sheet is fixedly connected to an upper end of the upper end cover.

14. The system for performing oil displacement by a water-gas dispersion system according to claim 8, wherein the transducing ring has a thickness ranging from 3 to 8 mm.

15. The system for performing oil displacement by a water-gas dispersion system according to claim 8, wherein the trumpet-shaped body is further provided therein with pipelines communicating with the through hole on the cavity, for transporting outside gas into the cavity.

16. The system for performing oil displacement by a water-gas dispersion system according to claim 15, wherein the pipelines are disposed symmetrically on both sides of the trumpet-shaped body.

17. The system for performing oil displacement by a water-gas dispersion system according to claim 1, wherein the protective barrel is located on a ground, and the second opening in the side wall of the protective barrel includes a water inlet and a water outlet which are respectively connected with a water flooding pipe.

18. The system for performing oil displacement by a water-gas dispersion system according to claim 1, wherein the protective cylinder is connected to the bottom of an oil pipe and is secured in a water flooding well by the oil pipe.

19. A method of performing oil displacement based on the system for performing oil displacement by a water-gas dispersion system according to claim 1, comprising:
- opening a water flooding valve on a water flooding pipeline to inject water, wherein water flow gets into a protective barrel through a second opening in a side wall of the protective barrel;
- opening a gas source, wherein gas enters a micro-bubble generation apparatus within the protective barrel through a gas pipeline;
- turning on an ultrasonic oscillation controller, which controls the micro-bubble generation apparatus to generate micro-bubbles through a signal line, to obtain the water-gas dispersion system; and
- the water-gas dispersion system flowing out from the second opening along with the water flow, and entering an oil layer through the water flooding pipeline.

* * * * *